United States Patent
Thomas et al.

(10) Patent No.: US 12,049,235 B2
(45) Date of Patent: Jul. 30, 2024

(54) ROUTING FEATURE FLAGS (71) Applicant: Uber Technologies, Inc., San Francisco, CA (US)

(72) Inventors: Austin Thomas, San Francisco, CA (US); Shubhit Mohan Singh, San Francisco, CA (US); Jacob Robert Forster, San Francisco, CA (US); Bryan John Nagy, Allison Park, PA (US); Alan B. Sheinberg, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 104 days.

(21) Appl. No.: 17/444,023

(22) Filed: Jul. 29, 2021

(65) Prior Publication Data

US 2022/0032949 A1 Feb. 3, 2022

Related U.S. Application Data

(60) Provisional application No. 62/706,058, filed on Jul. 29, 2020.

(51) Int. Cl.
*B60W 60/00* (2020.01)
*G05D 1/00* (2024.01)

(52) U.S. Cl.
CPC ......... *B60W 60/001* (2020.02); *G05D 1/0214* (2013.01)

(58) Field of Classification Search
CPC .......... B60W 60/001; B60W 30/18163; G05D 1/0214; G01C 21/3461; G01C 21/3484; G01C 21/3446
See application file for complete search history.

(56) References Cited

U.S. PATENT DOCUMENTS

| | | | |
|---|---|---|---|
| 2017/0010613 A1* | 1/2017 | Fukumoto | |
| 2018/0130347 A1* | 5/2018 | Ricci | B60R 25/24 |
| 2018/0181135 A1* | 6/2018 | Urano | G05D 1/0055 |
| 2019/0277644 A1 | 9/2019 | Stephens et al. | |

(Continued)

FOREIGN PATENT DOCUMENTS

| | | | | |
|---|---|---|---|---|
| EP | 3611471 | | 2/2020 | |
| EP | 3611471 A1 * | | 2/2020 | ......... G01C 21/3446 |

(Continued)

OTHER PUBLICATIONS

"International Application Serial No. PCT US2021 071047, International Search Report mailed Oct. 22, 2021", 4 pgs.

(Continued)

*Primary Examiner* — Amelia Vorce (74) *Attorney, Agent, or Firm* — Schwegman Lundberg & Woessner, P.A.

(57) ABSTRACT

Systems and methods herein describe accessing a set of feature flags, a first feature flag in the set of feature flag describing vehicle navigation behavior on a routing graph, the routing graph representing the roadway, associating the set of feature flags with a vehicle, applying the associated set of feature flags to a graph traversal algorithm to generate a modified graph traversal algorithm, generating the route using the modified graph traversal algorithm; and transmitting instructions to the vehicle to begin executing the route.

18 Claims, 6 Drawing Sheets

(56) References Cited

U.S. PATENT DOCUMENTS

| | | | | |
|---|---|---|---|---|
| 2020/0084646 A1* | 3/2020 | Melderis | ............... | H04W 40/12 |
| 2021/0053569 A1* | 2/2021 | Censi | .............. | B60W 30/18163 |
| 2021/0129851 A1* | 5/2021 | Wieczorek | ............ | B60W 40/08 |
| 2021/0239476 A1* | 8/2021 | Duym | .................. | G05D 1/0217 |
| 2022/0381569 A1* | 12/2022 | Khan | ................. | G01C 21/3446 |
| 2023/0227063 A1* | 7/2023 | Badouin | .......... | G08G 1/096775 |
| | | | | 701/23 |

FOREIGN PATENT DOCUMENTS

| | | | | |
|---|---|---|---|---|
| WO | WO-2019219722 A1 * | 11/2019 | ........... | B60K 28/066 |
| WO | 2022027057 | 2/2022 | | |

OTHER PUBLICATIONS

"International Application Serial No. PCT US2021 071047, Written Opinion mailed Oct. 22, 2021", 4 pgs.

"International Application Serial No. PCT US2021 071047, International Preliminary Report on Patentability mailed Feb. 9, 2023", 7 pgs.

* cited by examiner

ROUTING FEATURE FLAGS

CLAIM FOR PRIORITY

This application claims the benefit of priority of U.S. Application Ser. No. 62/706,058, filed Jul. 29, 2020, which is hereby incorporated by reference in its entirety.

TECHNICAL FIELD

This document pertains generally, but not by way of limitation, to devices, systems, and methods for operating an autonomous vehicle.

BACKGROUND

An autonomous vehicle is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on the resulting information.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DETAILED DESCRIPTION

Examples described herein are directed to systems and methods for routing an autonomous vehicle.

In an autonomous or semi-autonomous vehicle (collectively referred to as an autonomous vehicle (AV)), a vehicle autonomy system, sometimes referred to as an AV stack, controls one or more of braking, steering, or throttle of the vehicle. In a fully autonomous vehicle, the vehicle autonomy system assumes full control of the vehicle. In a semi-autonomous vehicle, the vehicle autonomy system assumes a portion of the vehicle control, with a human user (e.g., a vehicle operator) still providing some control input. Some autonomous vehicles can also operate in a manual mode, in which a human user provides all control inputs to the vehicle.

A vehicle autonomy system can control an autonomous vehicle along a route. A route is a path that the autonomous vehicle takes, or plans to take, over one or more roadways. The route for an autonomous vehicle is generated by a routing engine, which can be implemented onboard the autonomous vehicle or offboard the autonomous vehicle. The routing engine can be programmed to generate routes that optimize the time, risk, and/or other factors associated with driving on the roadways.

In some examples, the routing engine generates a route for the autonomous vehicle using a routing graph. The routing graph is a graph that represents roadways as a set of graph elements. A graph element is a component of a routing graph that represents a roadway element on which the autonomous vehicle can travel. A graph element can be or include an edge, node, or other component of a routing graph. A graph element represents a portion of roadway, referred to herein as a roadway element. A roadway element is a component of a roadway that can be traversed by a vehicle.

A roadway element be or include different subdivisions of a roadway, depending on the implementation. In some examples, the roadway elements are or include road segments. A road segment is a portion of roadway including all lanes and directions of travel. Consider a four-lane divided highway. A road segment of the four-lane divided highway includes a stretch of the highway including all four lanes and both directions of travel.

In some examples, roadway elements are or include directed road segments. A directed road segment is a portion of roadway where traffic travels in a common direction. Referring again to the four-lane divided highway example, a stretch of the highway would include at least two directed road segments: a first directed road segment including the two lanes of travel in one direction and a second directed road segment including the two lanes of travel in the other direction.

In some examples, roadway elements are or include lane segments. A lane segment is a portion of a roadway including one lane of travel in one direction. Referring again to the four-lane divided highway example, a portion of the divided highway may include two lane segments in each direction. Lane segments may be interconnected in the direction of travel and laterally. For example, a vehicle traversing a lane segment may travel in the direction to travel to the next connected lane segment or may make a lane change to move laterally to a different lane segment.

The routing graph includes data describing directionality and connectivity for the graph elements. The directionality of a graph element describes limitations (if any) on the direction in which a vehicle can traverse the roadway element corresponding to the graph element. The connectivity of a given graph element describes other graph elements to which the autonomous vehicle can be routed from the given graph element.

The routing graph can also include cost data describing costs associated with graph elements. The cost data indicates a cost to traverse a roadway element corresponding to a graph element or to transition between roadway elements corresponding to connected graph elements. Cost can be based on various factors including, for example, estimated driving time, danger risk, etc. In some examples, higher cost generally corresponds to more negative characteristics of a graph element or transition (e.g., longer estimated driving time, higher danger risk, etc.).

The routing engine determines a best route, for example, by applying a path-planning algorithm to the routing graph. Any suitable path-planning algorithm can be used, such as, for example, A*, D*, Focused D*, D* Lite, GD*, or Dijkstra's algorithm. The best route includes a string of connected graph elements between a vehicle start point and a vehicle end point. A vehicle start point is a graph element corresponding to the roadway element where a vehicle will begin a route. A vehicle end point is a graph element corresponding to the roadway element where the vehicle will end a route. Some routes also traverse one or more waypoints, where a waypoint is a graph element between the vehicle start point and the vehicle end point corresponding to a roadway element that the autonomous vehicle is to traverse on a route. In some examples, waypoints are implemented to execute a transportation service for more than one passenger or more than one cargo. For example, passengers and/or cargo may be picked up and/or dropped off at some or all of the waypoints. The best route identified by the path-planning algorithm may be the route with the lowest cost (e.g., the route that has the lowest cost or the highest benefit).

In various examples, it is desirable to configure a routing engine to cope with roadway conditions, vehicle capabilities, and sometimes even business policy preferences. For example, if a portion of a roadway is closed for construction, it is desirable that the routing engine avoid routing the autonomous vehicle through graph elements that correspond to the closed portion. Also, it is desirable that the routing engine avoid routing an autonomous vehicle through graph elements that include maneuvers that the autonomous vehicle is not capable of making. Further, it may be desirable for the routing engine to avoid routing autonomous vehicles through graph elements selected according to business policies, such as, for example, graph elements corresponding to roadway elements that are in school zones.

A routing graph can be constructed in view of different roadway conditions, vehicle capabilities, and/or policy preferences. For example, if a roadway condition makes a roadway element corresponding to a particular graph element impassable or less desirable, this can be reflected in the routing graph. For example, the routing graph may be constructed to omit the graph element, omit connectivity data describing transitions to and/or from the graph element, or increase a cost of traversing or transitioning to the graph element, etc.

Generating a custom routing graph for each unique permutation of roadway conditions, vehicle capabilities, policy preferences, or other considerations, however, can be costly and inefficient. For example, in some implementations a routing engine can be implemented centrally to generate routes for many different types of autonomous vehicles. Using a distinct routing graph for each type of vehicle can lead to inefficiencies related to data storage, data management, and other factors. Also, roadway conditions can change over time. Modifying a routing graph every time that there is a change in a roadway condition can be cumbersome. Also, it may be desirable to modify business policies over time and, sometimes, even for different vehicle types. Again, modifying routing graphs for every business policy change can be cumbersome and inefficient.

Various examples described herein are directed to routing autonomous vehicles utilizing a routing graph and routing graph modification data. The routing graph is a general-purpose routing graph that is usable for different types of autonomous vehicles, different business policies, and/or different roadway conditions. Routing graph modification data can be applied to the general-purpose routing graph either before or during routing to generate a constrained routing graph. A routing engine applies the constrained routing graph to generate routes for a particular type of autonomous vehicle, a particular set of roadway conditions, a particular set of policies, etc. Further, if roadway conditions, vehicle capabilities, policies, etc. change, it may not be necessary to create new routing graphs. Instead, routing graph modification data is created and/or modified to reflect changes.

Routing graph modification data can describe one or more routing graph modifications. A routing graph modification is a change to a routing graph (e.g., a general-purpose routing graph) that reflects various factors including, for example, capabilities of the vehicle that is to execute a route, current roadway conditions, business policy considerations, and so on. A routing graph modification includes a graph element descriptor and a constraint.

A graph element descriptor is data describing one or more graph elements that are the subject of a routing graph modification. For example, a graph element descriptor can describe graph elements using one or more graph element properties. A graph element property is anything that describes a graph element and/or its corresponding roadway element. Example graph element properties include, for example, a unique identifier for the graph element, a roadway type of the corresponding roadway element (e.g., divided highway, urban street, etc.), a driving rule of the roadway element associated with the graph element (e.g., speed limit, access limitations), a type of maneuver necessary to enter, exit, and/or traverse the corresponding roadway element, whether the corresponding roadway element leads to a specific type of roadway element (e.g., dead end, divided highway, etc.), and so on.

In some examples, a graph element descriptor is expressed as a predicate. A predicate is a question that has a binary answer. For example, a graph element descriptor expressed as a predicate may identify a predicate graph element property. If a graph element is described by the predicate graph element property, then the constraint is applied to that graph element. An example predicate graph element descriptor may include an assertion that a graph element has a speed limit greater than 35 miles per hour (mph). The constraint may be applied to graph elements that are described by the predicate graph element descriptor and not applied to graph elements that are not described by the predicate graph element.

A constraint is an action applied to graph elements at a routing graph that are described by the graph element descriptor of a routing graph modification. Example constraints that may be applied to a graph element include removing the graph element from the routing graph, modifying (e.g., removing) transitions to or from a graph element, changing a cost associated with a graph element or transitions involving the graph element, etc. Another example routing graph modification can include changing a required or recommended autonomous vehicle mode. For example, a graph element can be modified to indicate that an autonomous vehicle traversing the roadway element corresponding to the graph element should be operated in a semi-autonomous or manual mode.

The routing graph modification data described above describes the changes to the routing graph for a vehicle. For example, the routing graph modification data defines the graph on which a routing engine makes routing decisions. The routing graph modification data, however, may not inform the routing engine on how the vehicle should traverse a routing graph or a modified routing graph.

The routing feature flag data modifies the way in which the vehicle traverses a routing graph. At each node in the routing graph (or modified routing graph), the routing engine uses the routing feature flag data to determine how the vehicle should behave on the routing graph. Unlike constraints, the routing feature flag data does not modify (e.g., remove) a graph element (e.g., edges and nodes) from the routing graph. At each node, the routing engine determines the cost from the current node to a next node, based on the routing feature flag data. Thus, the routing feature flag data modifies how the vehicle traverses a routing graph instead of modifying the routing graph.

Routing feature flag data describes a routing property that may not be otherwise captured by the vehicle capability data, roadway condition data, or business policy data. For example, the routing feature flag data alters the manner by which the vehicle executes the route(s) provided to the vehicle by the routing engine. Instead of generating a modified routing graph, the routing feature flag data impacts how the vehicle executes route(s) described by the modified routing graph. The routing feature flag data captures a quality of the vehicle or a behavior of the vehicle.

Figure 1:
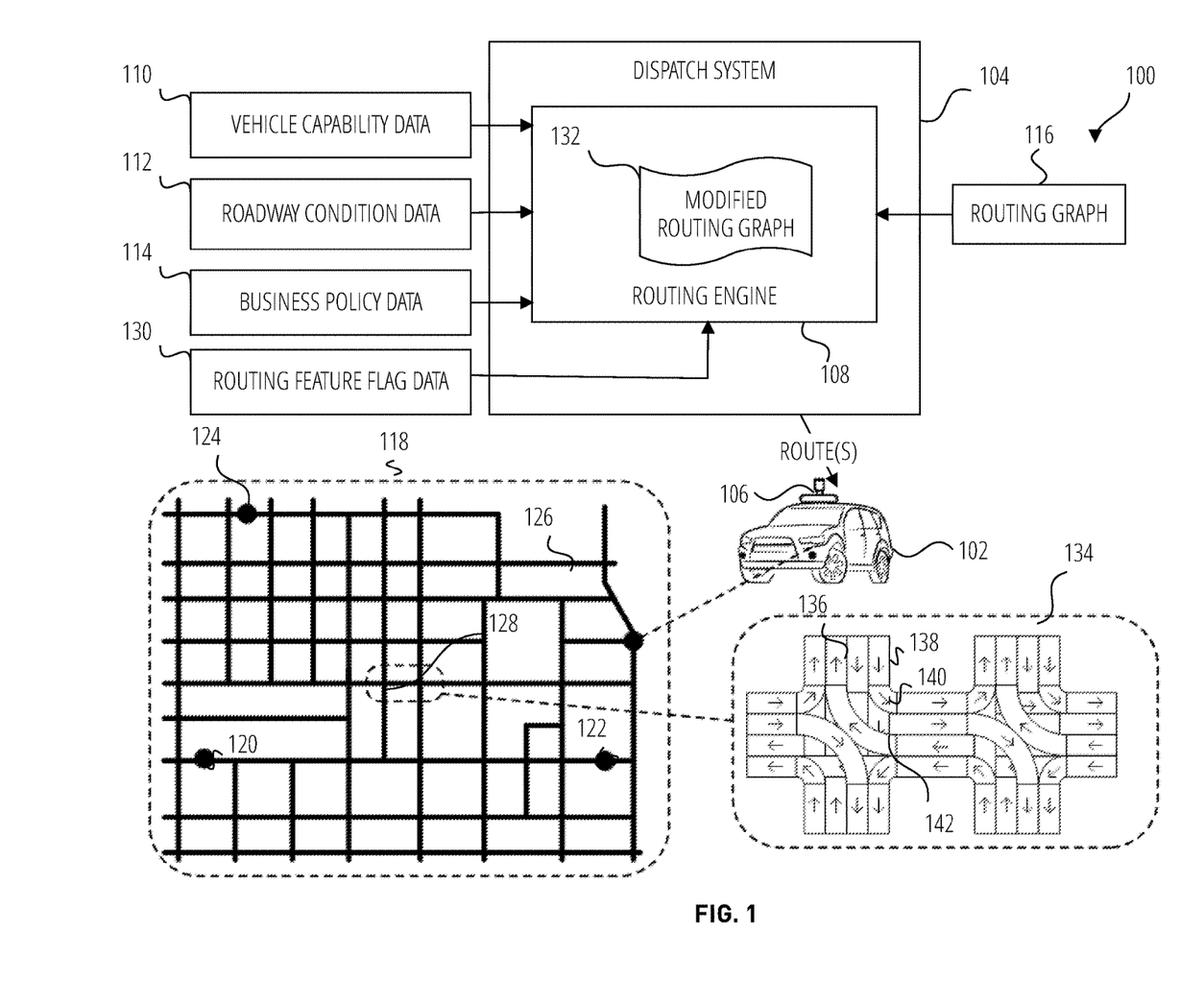
FIG. 1 is a diagram showing one example of an environment for routing an autonomous vehicle.

FIG. 1 is a diagram showing one example of an environment 100 for routing an autonomous vehicle. The environment 100 includes a vehicle 102. The vehicle 102 can be a passenger vehicle such as a car, a truck, a bus, or another similar vehicle. The vehicle 102 can also be a delivery vehicle, such as a van, a truck, a tractor trailer, etc. The vehicle 102 is a self-driving vehicle (SDV) or autonomous vehicle (AV). The vehicle 102 includes a vehicle autonomy system, described in more detail with respect to FIG. 3, that is configured to operate some or all of the controls of the vehicle 102 (e.g., acceleration, braking, steering).

In some examples, the vehicle 102 is operable in different modes, where the vehicle autonomy system has differing levels of control over the vehicle 102 in different modes. In some examples, the vehicle 102 is operable in a fully autonomous mode in which the vehicle autonomy system has responsibility for all or most of the controls of the vehicle 102. In addition to or instead of the fully autonomous mode, the vehicle autonomy system, in some examples, is operable in a semi-autonomous mode in which a human user or driver is responsible for some control of the vehicle 102. The vehicle 102 may also be operable in a manual mode in which the human user is responsible for all control of the vehicle 102. Additional details of an example vehicle autonomy system are provided in FIG. 3.

The vehicle 102 has one or more remote-detection sensors 106 that receive return signals from the environment 100. Return signals may be reflected from objects in the environment 100, such as the ground, buildings, trees, etc. The remote-detection sensors 106 may include one or more active sensors, such as LIDAR, RADAR, and/or SONAR sensors, that emit sound or electromagnetic radiation in the form of light or radio waves to generate return signals. The remote-detection sensors 106 can also include one or more passive sensors, such as cameras or other imaging sensors, proximity sensors, etc., that receive return signals that originated from other sources of sound or electromagnetic radiation. Information about the environment 100 is extracted from the return signals. In some examples, the remote-detection sensors 106 include one or more passive sensors that receive reflected ambient light or other radiation, such as a set of monoscopic or stereoscopic cameras. The remote-detection sensors 106 provide remote-detection sensor data that describes the environment 100. The vehicle 102 can also include other types of sensors, for example, as described in more detail with respect to FIG. 3.

The environment 100 also includes a dispatch system 104 executing a routing engine 108. The dispatch system 104 can be configured to generate routes for multiple autonomous vehicles of different types including, for example, the vehicle 102 and vehicles 120, 122, 124 described in more detail herein. In some examples, the dispatch system 104 dispatches transportation services in which the vehicles 102, 120, 122, 124 pick up and drop off passengers, cargo, or other material. Examples of cargo or other material can include, food, material goods, and the like.

The dispatch system 104 can include one or more servers or other suitable computing devices that execute the routing engine 108. The routing engine 108 is programmed to generate routes for the various vehicles 102, 120, 122, 124 utilizing a routing graph and routing graph modification data, as described herein. In some examples, routes generated by the routing engine 108 are provided to one or more of the vehicles 102, 120, 122, 124. For example, the dispatch system 104 can provide a route to the vehicle 102, 120, 122, 124 with an instruction that the vehicle 102, 120, 122, 124 begin traveling the route.

In some examples, the dispatch system 104 generates routes for the vehicles 102, 120, 122, 124 and uses the generated routes to determine whether to offer a transportation service to a particular vehicle 102, 120, 122, 124. For example, the dispatch system 104 can receive a request for a transportation service between a vehicle start point and a vehicle end point. The dispatch system 104 can use the routing engine 108 to generate routes for executing the transportation service for multiple vehicles 102, 120, 122, 124. The dispatch system 104 can offer the transportation service to the vehicle 102, 120, 122, 124 having the most favorable (e.g., lowest-cost) route for executing the transportation service. If the vehicle accepts the transportation service, the dispatch system 104 may provide the generated route to the vehicle, or the vehicle can generate its own route for executing the transportation service.

The routing engine 108 can generate routes utilizing, for example, a routing graph 116 in conjunction with routing graph modification data describing routing graph modifications to be applied to the routing graph 116 to generate a constrained routing graph 109. In some examples, routing graph modifications are based on various input data such as, for example, business policy data 114, vehicle capability data 110, and/or roadway condition data 112. The routing engine 108 accesses the routing graph 116 and/or other data in any suitable manner. In some examples, the routing graph 116 and/or other data 110, 112, 114 is stored at a data storage device associated with the dispatch system 104. Also, in some examples, the routing graph 116 and/or other data 110, 112, 114 routing graph modification data can be received from another source or system. For example, the vehicle capability data 110 0 can be, or be derived from, operational domain (OD) data or operational design domain (ODD) data provided by the manufacturer of the vehicle 102 or of its vehicle autonomy system.

FIG. 1 shows a graphical representation 118 including various interconnected roadways 126 that are represented by the routing graph 116.

A break-out window 134 shows example graph elements 136-142 to illustrate additional details of the example routing graph 116. Graph elements in the break-out window 134 correspond to the indicated portion of the roadways 126. The graph elements, including graph elements 136-142 are illustrated as shapes with arrows indicating the directionality of the graph elements. Graph elements can be connected to one another according to their directionality. For example, a vehicle can approach an intersection 128 by traversing a roadway element corresponding to an example graph element 138. From there, vehicle can transition to an example graph element 142, representing a path that proceeds straight through the intersection 128. The vehicle could also transition to a graph element 140, representing a path that turns right at the intersection 128. In some examples, the vehicle can also transition from the graph element 138 to a graph element 136, representing a path that changes lanes.

The routing engine 108 is configured to utilize the input data, such as the business policy data 114, roadway condition data 112, and/or vehicle capability data 110, to generate routing graph modifications that are applied to the routing graph 116 to generate modified routing graph 132 data. The modified routing graph 132 data is used to generate a route. Generally, routing graph modification data for a particular routing graph modification includes a graph element descriptor describing a graph element or elements that are to be constrained and a constraint. The constraint can include, for example, removing graph elements having the indicated property or properties from the routing graph 116, removing connections to graph elements described by the graph element descriptor, and/or changing a cost of graph elements described by the graph element descriptor. Another example routing graph modification can include changing a cost associated with a graph element and/or transitions to the graph element.

Costs may be changed up or down. For example, if routing graph modification data indicates that graph elements having a particular property or set of properties are disfavored, the costs to traverse and/or transition to the graph elements can be increased. On the other hand, if routing graph modification data indicates that graph elements having a particular property or set of properties are favored, the costs to traverse and/or transition to the graph elements can be decreased.

Constraints are applied to graph elements that meet the group element descriptor. For example, if a business policy forbids routing a vehicle through roadway elements that include or are in a school zone, a corresponding constraint includes removing the graph elements corresponding to school zone roadway elements from the routing graph 116 and/or removing transitions to such graph elements. Routing graph modifications can, in some examples, include constraints that are applied to graph elements other than those described by the graph element descriptor. Consider an example routing graph modification that is to avoid cul-de-sacs. The associated constraint could involve removing graph elements that correspond to cul-de-sacs and also removing graph elements that do not correspond to cul-de-sacs but do correspond to road segments that can lead only to cul-de-sacs.

The business policy data 114 can describe business policies that can be reflected in routing graph modifications. Business policies can describe types of roadway elements that it is desirable for a vehicle to avoid or prioritize. An example business policy is to avoid roadway elements that are in or pass through school zones. Another example business policy is to avoid routing vehicles through residential neighborhoods. Yet another example business policy is to favor routing vehicles on controlled-access highways, if available. Business policies can apply to some vehicles, some vehicle types, all vehicles, or all vehicle types.

The vehicle capability data 110 describes the capabilities of various different types of vehicle. For example, the dispatch system 104 can be programmed to generate routes for vehicles 102, 120, 122, 124 having different types of vehicle autonomy systems, different types of sensors, different software versions, or other variations. Vehicles of different types can have different capabilities. For example, a vehicle of one type may be capable of making all legal unprotected lefts. A vehicle of another type may be incapable of making unprotected lefts, or capable of making unprotected lefts only if oncoming traffic is traveling less than a threshold speed. In another example, one type of vehicle may be capable of traveling on controlled-access highways, while another type of vehicle may be capable of traveling only on roadways with a speed limit that is less than 45 miles per hour.

A routing graph modification based on the vehicle capability data 110 may include a graph element descriptor indicating graph components corresponding to roadway elements that are disfavored and/or not traversable by vehicles of a given type (e.g., includes an unprotected left, is part of a controlled-access highway, etc.) as well as a corresponding constraint indicating what is to be done to graph elements meeting the graph element descriptor. For example, graph elements corresponding to roadway elements that a particular vehicle type is not capable of traversing can be removed from the routing graph 116 or can have connectivity data modified to remove transitions to those graph elements. If the graph element descriptor indicates a graph element including a maneuver that is undesirable for a vehicle, but not forbidden, then the constraint can call for increasing the cost of an identified graph element or transitions thereto.

The roadway condition data 112 describes routing graph modifications based, for example, on the state of one or more roadways. For example, if a roadway is to be closed for a parade or for construction, a routing graph modification can be used to remove the corresponding graph elements from the routing graph 116. In some examples, routing graph modifications based on roadway condition data 112 are operational. For example, such routing graph modifications may identify graph elements using unique identifiers of the graph elements.

The routing engine 108 generates the modified routing graph 132 by applying routing graph modification data describing routing graph modifications. The described routing graph modifications may be based on the business policy data 114, roadway condition data 112, and/or vehicle capability data 110. The modified routing graph 132 is used to generate a route for a vehicle 102, 120, 122, 124. The routing engine 108, in some examples, generates the modified routing graph 132 at different times during route generation. In some examples, the routing engine 108 receives a request to generate a route for a particular vehicle 102, 120, 122, 124. The routing engine 108 responds by accessing the current routing graph modification data for the vehicle 102, 120, 122, 124. The routing engine 108 applies the routing graph modification data to the routing graph 116 to generate the modified routing graph 132 and then uses the modified routing graph 132 to generate a route.

In another example, the routing engine 108 generates the modified routing graph 132 on an as-needed basis. For example, various path-planning algorithms described herein operate using graph expansion. To apply a graph expansion-type algorithm, the routing engine 108 begins at an algorithm start point and expands along allowable transitions to string together connected graph elements. The algorithm is complete when one or more of the strings of connected graph elements has an allowable transition to or from an algorithm end point. Many graph-expansion algorithms can be applied forwards (e.g., from a vehicle start point to a vehicle end point) or backwards (e.g., from a vehicle end point to a vehicle start point).

To generate the modified routing graph 132 on an as-needed basis, the routing engine 108 can request a subset of the modified routing graph 132 while graph expansion is being performed. For example, the routing engine 108 can determine a first portion of a route including a string of connected graph elements. The routing engine 108 can then request the modified routing graph 132 data describing a set of graph elements that can be transitioned to the last graph element of the string (or a set of graph elements from which a vehicle can transition to the last graph element of the string if the algorithm is applied backwards). In this way, the routing engine 108 may not need to apply the routing graph modification data to all graph elements of the routing graph 116 but, instead, only to the graph elements used by the path-planning algorithm.

The routing graph modification data described above describes the changes to the routing graph for a vehicle 102. For example, the routing graph modification data defines the graph on which a routing engine makes routing decisions. The routing graph modification data, however, may not inform the routing engine 108 on how the vehicle 102 should traverse a routing graph or a modified routing graph.

Routing feature flag data 130 describes a routing property that may not be otherwise captured by the vehicle capability data 110, roadway condition data 112, or business policy data 114. For example, the routing feature flag data 130 alters the manner by which the vehicle 102 executes the route(s) provided to the vehicle 102 by the routing engine 108. Instead of generating a modified routing graph 132, the routing feature flag data 130 impacts how the vehicle 102 executes route(s) described by the modified routing graph 132. The routing feature flag data 130 captures a quality of the vehicle 102 or a behavior of the vehicle 102. For example, routing feature flag data 130 can describe whether the vehicle 102 may perform lane changes. The routing feature flag data 130 can also describe whether the vehicle 102 is being operated by a human or being operated autonomously. In some examples, the routing feature flag data 130 can describe a preference for the vehicle 102 to operate on route(s) that minimize the number of turns (e.g., a preference that the vehicle 102 drives straight on a route).

Based on the routing feature flag data 130, the routing engine 108 generates a modified path-planning algorithm. The routing engine 108 applies the modified path-planning algorithm to the modified routing graph 132. For example, the routing engine 108 may be applying the path-planning algorithm, A*, to the modified routing graph 132. However, in applying A*, the routing engine 108 further takes into consideration the routing feature flag data 130. Thus, at each node in the modified routing graph 132, the routing engine 108 applies a modified A* based on the routing feature flag data 130. For example, the routing feature flag data may indicate that the vehicle 102 is being operated autonomously. If the routing engine 108 was applying A* without any modifications, the vehicle 102 may be routed to take the next left turn. However, per the routing feature flag data that indicates that the vehicle 102 is being operated in autonomous mode, the routing engine 108 modifies A* such that the vehicle 102 is routed to continue going straight on the current roadway element.

In some examples, the routing feature flag data 130 is associated with a fleet of vehicles. For example, a configuration of routing feature flags is associated with a fleet of vehicles. A configuration is a combination of values for all feature flags (e.g., non-vehicle operator is enabled, lane changes are enabled, etc.).

The routing feature flag data 130 (e.g., configuration of routing feature flags) is transmitted to the routing engine 108. The routing engine 108 encodes logic for each routing feature flag that will affect how the vehicle 102 chooses to traverse the modified routing graph 132. The routing engine 108 also encodes default behavior for each feature flag in the routing feature flag data 130. For example, if a routing feature flag in the routing feature flag data 130 has an unset value, the routing engine 108 provides a default value indicating default behavior to the routing feature flag.

Figure 2:
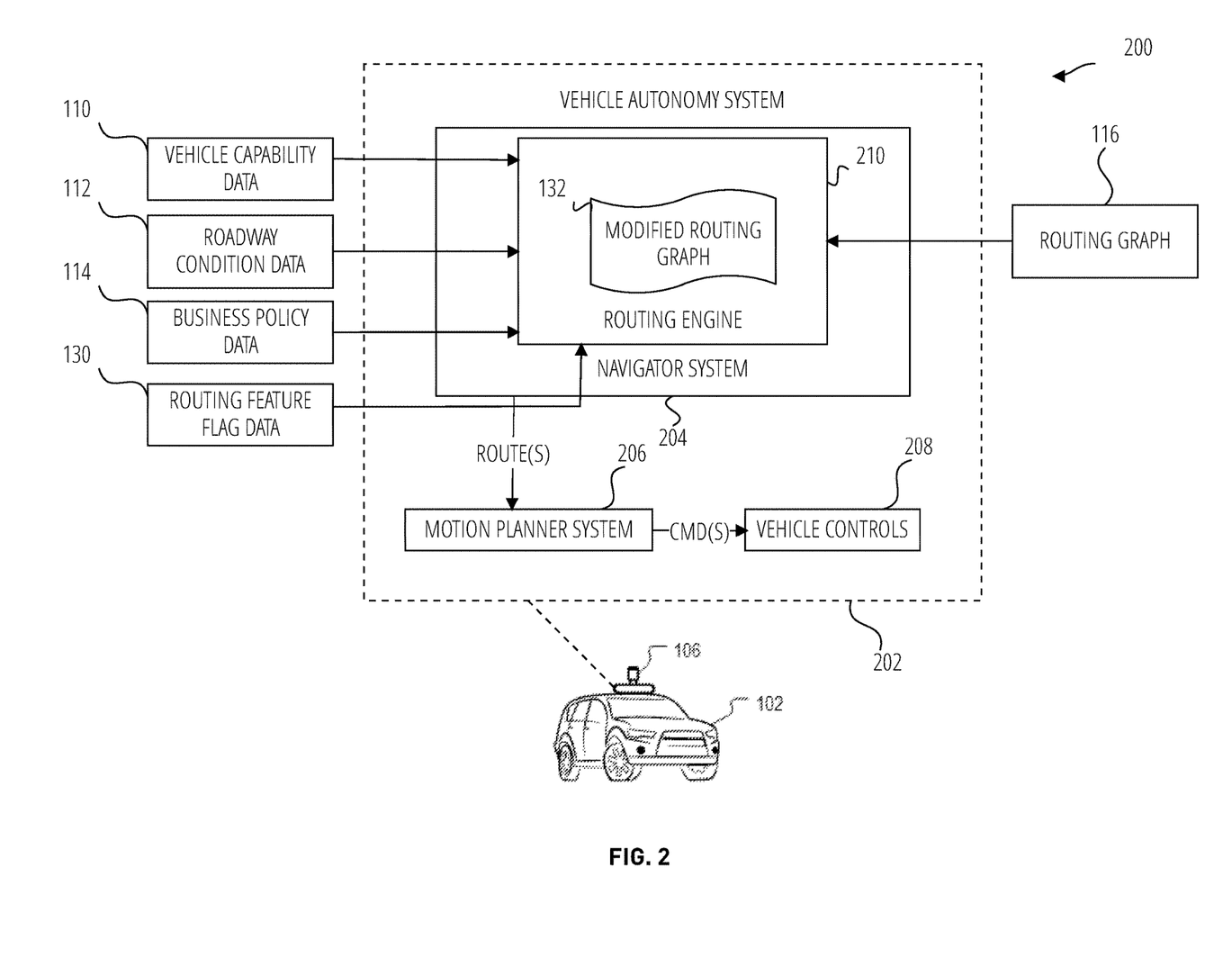
FIG. 2 is a diagram showing another example of an environment for routing an autonomous vehicle, according to some example embodiments.

FIG. 2 is a diagram showing another example of an environment 200 for routing an autonomous vehicle. In the environment 200, a routing engine is implemented by a vehicle autonomy system 202 of the vehicle 102 (e.g., onboard the vehicle 102). The routing engine 210 can operate in a manner similar to that of the routing engine 108 of FIG. 1. For example, the routing engine 210 can generate modified routing graph 132 data from a general-purpose routing graph 116 and routing graph modification data that can be based on business policy data 114, roadway condition data 112, and/or vehicle capability data 110. In the example of FIG. 2, the routing graph modification data can be pre-loaded and/or transmitted to the vehicle 102. The routing engine 210 can further generate route(s) for the vehicle 102 using routing feature flag data 130. For example, the vehicle 102 can traverse roadway elements corresponding to the modified routing graph 132 using a modified path-planning algorithm. The modified path planning algorithm can be based on the routing feature flag data 130.

Different types of autonomous vehicles will have differently arranged vehicle autonomy systems. In the example of FIG. 2, however, the routing engine 210 is implemented by a navigator system 204 of the vehicle autonomy system 202. The navigator system 204 provides one or more routes, generated as described herein, to a motion planner system 206. The motion planner system 206 generates commands that are provided to vehicle controls 208 to cause the vehicle to travel along the indicated route. Additional details of example navigator systems, motion planner systems, and vehicle controls are described herein with respect to FIG. 3.

Figure 3:
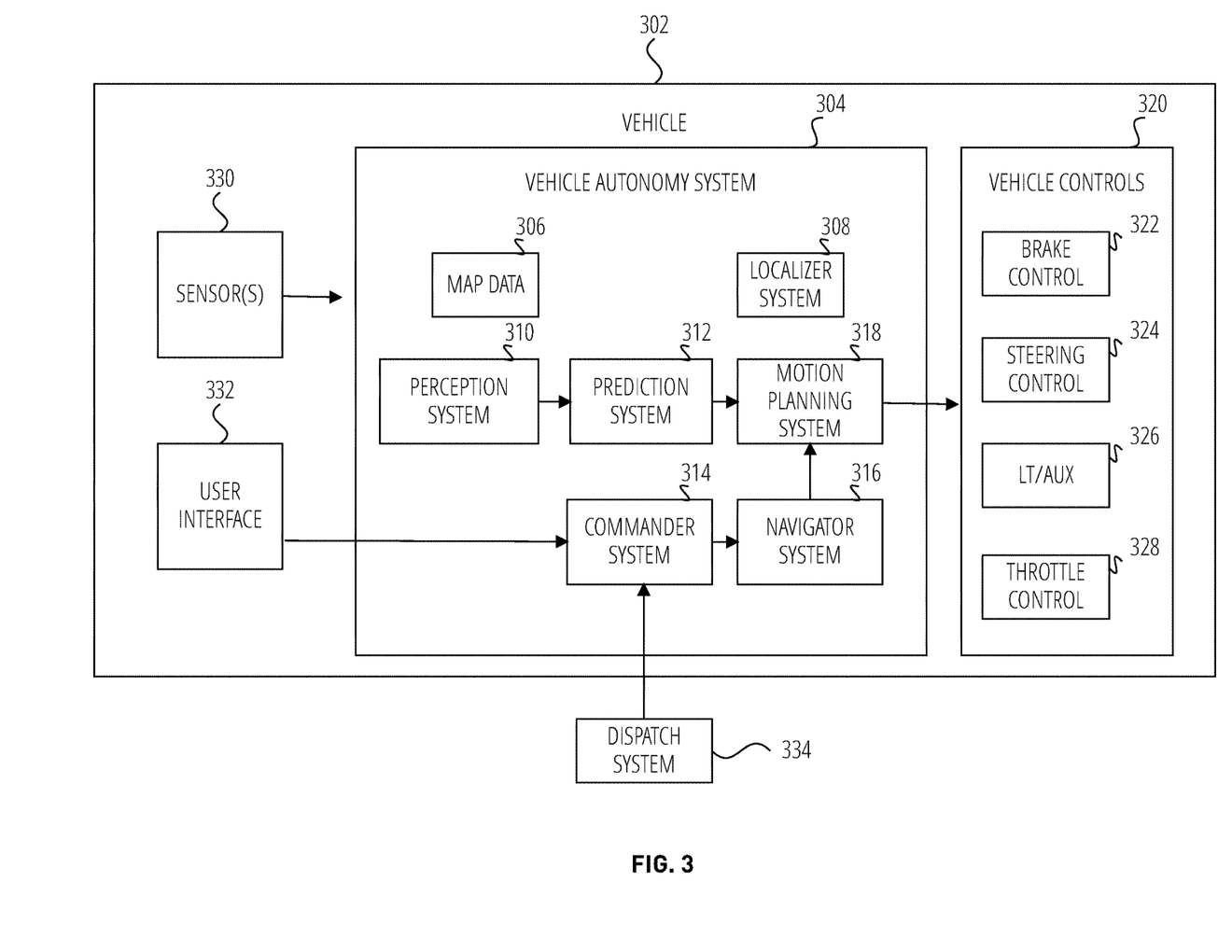
FIG. 3 depicts a block diagram of an example vehicle according to example aspects of the present disclosure.

FIG. 3 depicts a block diagram of an example vehicle 302 according to example aspects of the present disclosure. The vehicle 302 includes one or more sensor(s) 330, a vehicle autonomy system 304, and one or more vehicle controls 320. The vehicle 302 is an autonomous vehicle, as described herein.

The vehicle autonomy system 304 includes a commander system 314, a navigator system 316, a perception system 310, a prediction system 312, a motion planning system 318, and a localizer system 308 that cooperate to perceive the surrounding environment of the vehicle 302 and determine a motion plan for controlling the motion of the vehicle 302 accordingly.

The vehicle autonomy system 304 is engaged to control the vehicle 302 or to assist in controlling the vehicle 302. In particular, the vehicle autonomy system 304 receives sensor data from the one or more sensor(s) 330, attempts to comprehend the environment surrounding the vehicle 302 by performing various processing techniques on data collected by the sensor(s) 330, and generates an appropriate route through the environment. The vehicle autonomy system 304 sends commands to control the one or more vehicle controls 320 to operate the vehicle 302 according to the route.

Various portions of the vehicle autonomy system 304 receive sensor data from the one or more sensor(s) 330. For example, the sensors 301 may include remote-detection sensors as well as motion sensors such as an inertial measurement unit (IMU), one or more encoders, or one or more odometers. The sensor data includes information that describes the location of objects within the surrounding environment of the vehicle 302, information that describes the motion of the vehicle 302, etc.

The sensor(s) 330 may also include one or more remote-detection sensors or sensor systems, such as a LIDAR system, a RADAR system, one or more cameras, etc. As one example, a LIDAR system of the one or more sensor(s) 330 generates sensor data (e.g., remote-detection sensor data) that includes the location (e.g., in three-dimensional space relative to the LIDAR system) of a number of points that correspond to objects that have reflected a ranging laser. For example, the LIDAR system measures distances by measuring the Time of Flight (TOF) that it takes a short laser pulse to travel from the sensor to an object and back, calculating the distance from the known speed of light.

As another example, a RADAR system of the one or more sensor(s) 330 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system reflect off an object and return to a receiver of the RADAR system, giving information about the object's location and speed. Thus, a RADAR system provides useful information about the current speed of an object.

As yet another example, one or more cameras of the one or more sensor(s) 330 may generate sensor data (e.g., remote-detection sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensor(s) 330 can include a positioning system. The positioning system determines a current position of the vehicle 302. The positioning system can be any device or circuitry for analyzing the position of the vehicle 302. For example, the positioning system can determine a position by using one or more of inertial sensors, a satellite positioning system such as the Global Positioning System (GPS), a positioning system based on IP address, triangulation and/or proximity to network access points or other network components (e.g., cellular towers, Wi-Fi access points), and/or other suitable techniques. The position of the vehicle 302 can be used by various systems of the vehicle autonomy system 304.

Thus, the one or more sensor(s) 330 are used to collect sensor data that includes information that describes the location (e.g., in three-dimensional space relative to the vehicle 302) of points that correspond to objects within the surrounding environment of the vehicle 302. In some implementations, the sensor(s) 330 can be positioned at various different locations on the vehicle 302. As an example, in some implementations, one or more cameras and/or LIDAR sensors can be located in a pod or other structure that is mounted on a roof of the vehicle 302, while one or more RADAR sensors can be located in or behind the front and/or rear bumper(s) or body panel(s) of the vehicle 302. As another example, one or more cameras can be located at the front or rear bumper(s) of the vehicle 302. Other locations can be used as well.

The localizer system 308 receives some or all of the sensor data from the sensor(s) 330 and generates vehicle poses for the vehicle 302. A vehicle pose describes a position and attitude of the vehicle 302. The vehicle pose (or portions thereof) can be used by various other components of the vehicle autonomy system 304 including, for example, the perception system 310, the prediction system 312, the motion planning system 318, and the navigator system 316.

The position of the vehicle 302 is a point in a three-dimensional space. In some examples, the position is described by values for a set of Cartesian coordinates, although any other suitable coordinate system may be used. The attitude of the vehicle 300 generally describes the way in which the vehicle 300 is oriented at its position. In some examples, attitude is described by a yaw about the vertical axis, a pitch about a first horizontal axis, and a roll about a second horizontal axis. In some examples, the localizer system 308 generates vehicle poses periodically (e.g., every second, every half second). The localizer system 308 appends time stamps to vehicle poses, where the time stamp for a pose indicates the point in time that is described by the pose. The localizer system 308 generates vehicle poses by comparing sensor data (e.g., remote-detection sensor data) to map data 306 describing the surrounding environment of the vehicle 302.

In some examples, the localizer system 308 includes one or more pose estimators and a pose filter. Pose estimators generate pose estimates by comparing remote-detection sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 308 generates vehicle poses. Accordingly, the pose filter generates some vehicle poses by extrapolating from a previous pose estimate utilizing motion sensor data.

Vehicle poses and/or vehicle positions generated by the localizer system 308 are provided to various other components of the vehicle autonomy system 302. For example, the commander system 314 may utilize a vehicle position to determine whether to respond to a call from a dispatch system 104.

The commander system 314 determines a set of one or more target locations that are used for routing the vehicle 302. The target locations are determined based on user input received via a user interface 332 of the vehicle 302. The user interface 332 may include and/or use any suitable input/output device or devices. In some examples, the commander system 314 determines the one or more target locations considering data received from the dispatch system 334. The dispatch system 334 is programmed to provide instructions to multiple vehicles, for example, as part of a fleet of vehicles for moving passengers and/or cargo. Data from the dispatch system 334 can be provided via a wireless network, for example.

The navigator system 316 receives one or more target locations from the commander system 314 and map data 306. The map data 306, for example, provides detailed information about the surrounding environment of the vehicle 302. The map data 306 provides information regarding identity and location of different roadways and segments of roadways (e.g., lane segments or graph elements). A roadway is a place where the vehicle 302 can drive and may include, for example, a road, a street, a highway, a lane, a parking lot, or a driveway. Routing graph data is a type of map data 306.

From the one or more target locations and the map data 306, the navigator system 316 generates route data describing a route for the vehicle 302 to take to arrive at the one or more target locations. In some implementations, the navigator system 316 determines route data using one or more path-planning algorithms based on costs for graph elements, as described herein. For example, a cost for a route can indicate a time of travel, risk of danger, or other factor associated with adhering to a particular candidate route. Route data describing a route is provided to the motion planning system 318, which commands the vehicle controls 320 to implement the route or route extension, as described herein. The navigator system 316 can generate routes as described herein using a general-purpose routing graph and routing graph modification data. Also, in examples where route data is received from the dispatch system 334, that route data can also be provided to the motion planning system 318.

The perception system 310 detects objects in the surrounding environment of the vehicle 302 based on sensor(s) 330 data, the map data 306, and/or vehicle poses provided by the localizer system 308. For example, the map data 306 used by the perception system 310 describes roadways and segments thereof and may also describe buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 304 in comprehending and perceiving its surrounding environment and its relationship thereto.

In some examples, the perception system 310 determines state data for one or more of the objects in the surrounding environment of the vehicle 302. State data describes a current state of an object (also referred to as features of the object). The state data for each object describes, for example, an estimate of the object's current location (also referred to as position); current speed (also referred to as velocity); current acceleration; current heading; current orientation; size/shape/footprint (e.g., as represented by a bounding shape such as a bounding polygon or polyhedron); type/class (e.g., vehicle, pedestrian, bicycle, or other); yaw rate; distance from the vehicle 300; minimum path to interaction with the vehicle 302; minimum time duration to interaction with the vehicle 302; and/or other state information.

In some implementations, the perception system 310 determines state data for each object over a number of iterations. In particular, the perception system 310 updates the state data for each object at each iteration. Thus, the perception system 310 detects and tracks objects, such as other vehicles, that are proximate to the vehicle 300 over time.

The prediction system 312 is configured to predict one or more future positions for an object or objects in the environment surrounding the vehicle 302 (e.g., an object or objects detected by the perception system 310). The prediction system 312 generates prediction data associated with one or more of the objects detected by the perception system 310. In some examples, the prediction system 304 generates prediction data describing each of the respective objects detected by the perception system 310.

Prediction data for an object is indicative of one or more predicted future locations of the object. For example, the prediction system 304 may predict where the object will be located within the next 5 seconds, 20 seconds, 300 seconds, etc. Prediction data for an object may indicate a predicted trajectory (e.g., predicted path) for the object within the surrounding environment of the vehicle 302. For example, the predicted trajectory (e.g., path) can indicate a path along which the respective object is predicted to travel over time (and/or the speed at which the object is predicted to travel along the predicted path). The prediction system 312 generates prediction data for an object, for example, based on state data generated by the perception system 310. In some examples, the prediction system 312 also considers one or more vehicle poses generated by the localizer system 308 and/or map data 306.

In some examples, the prediction system 312 uses state data indicative of an object type or classification to predict a trajectory for the object. As an example, the prediction system 312 can use state data provided by the perception system 310 to determine that a particular object (e.g., an object classified as a vehicle) approaching an intersection and maneuvering into a left-turn lane intends to turn left. In such a situation, the prediction system 312 predicts a trajectory (e.g., path) corresponding to a left-turn for the vehicle such that the vehicle turns left at the intersection. Similarly, the prediction system 312 determines predicted trajectories for other objects, such as bicycles, pedestrians, parked vehicles, etc. The prediction system 312 provides the predicted trajectories associated with the object(s) to the motion planning system 318.

In some implementations, the prediction system 312 is a goal-oriented prediction system 312 that generates one or more potential goals, selects one or more of the most likely potential goals, and develops one or more trajectories by which the object can achieve the one or more selected goals. For example, the prediction system 312 can include a scenario generation system that generates and/or scores the one or more goals for an object, and a scenario development system that determines the one or more trajectories by which the object can achieve the goals. In some implementations, the prediction system 312 can include a machine-learned goal-scoring model, a machine-learned trajectory development model, and/or other machine-learned models.

The motion planning system 318 commands the vehicle controls 320 based at least in part on the predicted trajectories associated with the objects within the surrounding environment of the vehicle 302, the state data for the objects provided by the perception system 310, vehicle poses provided by the localizer system 308, the map data 306, and route or route extension data provided by the navigator system 204. Stated differently, given information about the current locations of objects and/or predicted trajectories of objects within the surrounding environment of the vehicle 302, the motion planning system 318 determines control commands for the vehicle 302 that best navigate the vehicle 302 along the route or route extension relative to the objects at such locations and their predicted trajectories on acceptable roadways.

In some implementations, the motion planning system 318 can also evaluate one or more cost functions and/or one or more reward functions for each of one or more candidate control commands or sets of control commands for the vehicle 302. Thus, given information about the current locations and/or predicted future locations/trajectories of objects, the motion planning system 318 can determine a total cost (e.g., a sum of the cost(s) and/or reward(s) provided by the cost function(s) and/or reward function(s)) of adhering to a particular candidate control command or set of control commands. The motion planning system 318 can select or determine a control command or set of control commands for the vehicle 302 based at least in part on the cost function(s) and the reward function(s). For example, the motion plan that minimizes the total cost can be selected or otherwise determined.

In some implementations, the motion planning system 318 can be configured to iteratively update the route or route extension for the vehicle 302 as new sensor data is obtained from the one or more sensor(s) 330. For example, as new sensor data is obtained from the one or more sensor(s) 330, the sensor data can be analyzed by the perception system 310, the prediction system 312, and the motion planning system 318 to determine the motion plan.

The motion planning system 318 can provide control commands to the one or more vehicle controls 208. For example, the one or more vehicle controls 320 can include throttle systems, brake systems, steering systems, and other control systems, each of which can include various vehicle controls (e.g., actuators or other devices that control gas flow, steering, and braking) to control the motion of the vehicle 302. The various vehicle controls 307 can include one or more controllers, control devices, motors, and/or processors.

The vehicle controls 320 can include a brake control module 322. The brake control module 322 is configured to receive a braking command and bring about a response by applying (or not applying) the vehicle brakes. In some examples, the brake control module 322 includes a primary system and a secondary system. The primary system receives braking commands and, in response, brakes the vehicle 302. The secondary system may be configured to determine a failure of the primary system to brake the vehicle 302 in response to receiving the braking command.

A steering control module 324 is configured to receive a steering command and bring about a response in the steering mechanism of the vehicle 302. The steering command is provided to a steering system to provide a steering input to steer the vehicle 302.

A Lighting/auxiliary control module 326 receives a lighting or auxiliary command. In response, the Lighting/auxiliary control module 326 controls a lighting and/or auxiliary system of the vehicle 302. Controlling a lighting system may include, for example, turning on, turning off, or otherwise modulating headlights, parking lights, running lights, etc. Controlling an auxiliary system may include, for example, modulating windshield wipers, a defroster, etc.

A throttle control module 328 is configured to receive a throttle command and bring about a response in the engine speed or other throttle mechanism of the vehicle. For example, the throttle control module 328 can instruct an engine and/or engine controller, or other propulsion system component, to control the engine or other propulsion system of the vehicle 302 to accelerate, decelerate, or remain at its current speed.

Each of the perception system 310, the prediction system 312, the motion planning system 318, the commander system 314, the navigator system 316, and the localizer system 308 can be included in or otherwise be a part of the vehicle autonomy system 304 configured to control the vehicle 302 based at least in part on data obtained from the one or more sensor(s) 330. For example, data obtained by the one or more sensor(s) 330 can be analyzed by each of the perception system 310, the prediction system 312, and the motion planning system 318 in a consecutive fashion in order to control the vehicle 302. While FIG. 3 depicts elements suitable for use in a vehicle autonomy system according to example aspects of the present disclosure, one of ordinary skill in the art will recognize that other vehicle autonomy systems can be configured to control an autonomous vehicle based on sensor data.

The vehicle autonomy system 304 includes one or more computing devices, which may implement all or parts of the perception system 310, the prediction system 312, the motion planning system 318, and/or the localizer system 308. Descriptions of hardware and software configurations for computing devices to implement the vehicle autonomy system 202 and/or the dispatch system 334 are provided herein with reference to FIGS. 5 and 6.

Figure 4:
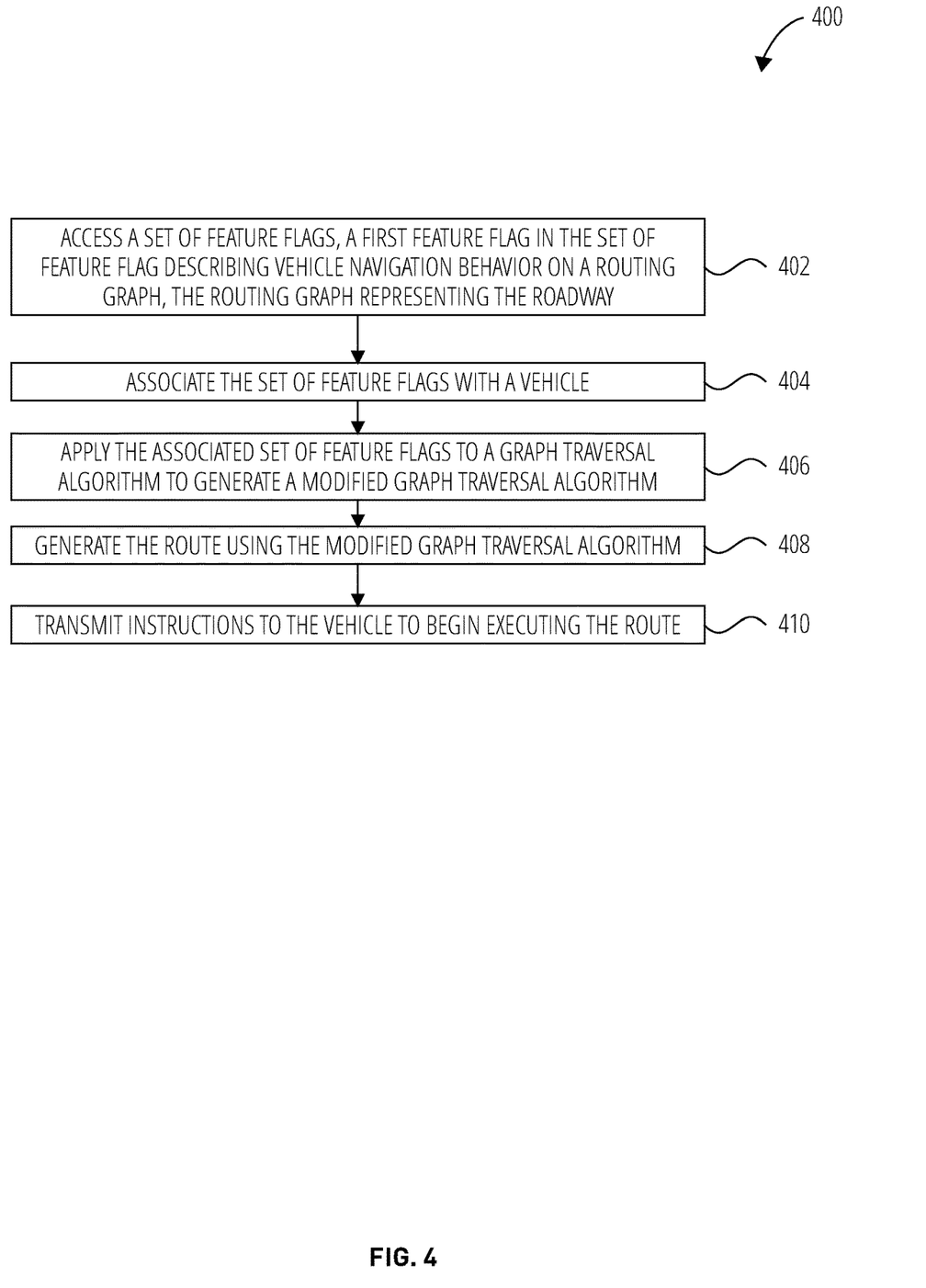
FIG. 4 is a flowchart showing one example of a process flow that can be executed by a routing engine to generate a modified route based on routing feature flags for an autonomous vehicle using routing graph modification data and a routing graph to generate a modified routing graph, according to some example embodiments.

FIG. 4 is a flowchart showing one example of a process flow 400 that can be executed by a routing engine to generate a modified route based on routing feature flags for an autonomous vehicle using routing graph modification data and a routing graph to generate a modified routing graph. The process flow 400 can be executed by routing engines in a variety of contexts. In some examples, the process flow 400 is executed by a routing engine that is implemented and/or used in conjunction with a navigator system or other remote system, such as the routing engine 108. In other examples, the process flow 400 is executed by a routing engine that is implemented onboard a vehicle, such as the routing engine 210.

In operation 402, process flow 400 accesses, using one or more processors, a set of feature flags, a first feature flag in the set of feature flag describing an aspect of vehicle navigation behavior on a routing graph, the routing graph representing the roadway. The roadway comprises roadway elements on a geographic map. In operation 404, process flow 400 associates the set of feature flags with a vehicle. In operation 406, process flow 400 applies the associated set of feature flags to a graph traversal algorithm to generate a modified graph traversal algorithm (e.g., modified path-planning algorithm). In operation 408, process flow 400 generates the route using the modified graph traversal algorithm. In operation 410, process flow 400 transmits instructions to the vehicle to begin executing the route.

Each feature flag in the set of feature flags has a flag value. For example, the set of feature flags comprises a vehicle operator feature flag, a lane change feature flag, and a weighted feature flag. The vehicle operator feature flag represents whether the vehicle is operated autonomously or with a vehicle operator (e.g., a human driver). The vehicle operator feature flag is a Boolean value. For example, the routing engine 108 encodes logic that indicates that when the vehicle operator feature flag is true, the vehicle 102 is permitted to traverse pre-defined roadway elements (e.g., roadway elements that are within school zones). Thus, if the vehicle operator feature flag is assigned a true Boolean value, the routing engine 108 classifies a roadway element (e.g., roadway elements that are within school zones) that can be traversed by the vehicle 102 as a permitted maneuver. If the vehicle operator feature flag is assigned a false Boolean value, the routing engine 108 classifies a roadway element (e.g., roadway elements that are within school zones) that cannot be traversed by the vehicle 102 as a forbidden maneuver. The routing engine 108 further generates routes using the modified graph traversal algorithm that excludes the portion of the roadway that cannot be traversed by the vehicle 102.

The lane change feature flag indicates whether the vehicle 102 is capable of changing lanes. The lane change feature flag is a Boolean value. For example, the routing engine 108 encodes logic that indicates that when the lane change feature flag is true, the vehicle 102 is permitted to change lanes provided that there is a minimum distance between the vehicle 102 and another vehicle that is in front of the vehicle 102. Thus, if the lane change feature flag is assigned a true Boolean value, the routing engine 108 classifies a roadway element (e.g., lanes adjacent to the current position of the vehicle 102) as a permitted maneuver. If the lane change feature flag is assigned a false Boolean value, the routing engine 108 classifies a roadway element (e.g., lanes adjacent to the current position of the vehicle 102) that cannot be traversed by the vehicle 102 as a forbidden maneuver. The routing engine 108 further generates routes using the modified graph traversal algorithm that excludes the roadway element(s) that cannot be traversed by the vehicle 102.

The weighted feature flag represents an importance of the aspect of vehicle navigation behavior. The weighted feature flag has an integer value. For example, the weighted feature flag may be an integer X that indicates a preference for the vehicle 102 to only use surface roads and avoid freeways or highways. Thus, the routing engine 108 provides routes to the vehicle 102 that exclusively use surface roads. In another example, the weighted feature flag indicates a preference for the vehicle 102 to minimize the number of turns it makes on a given route.

Figure 5:
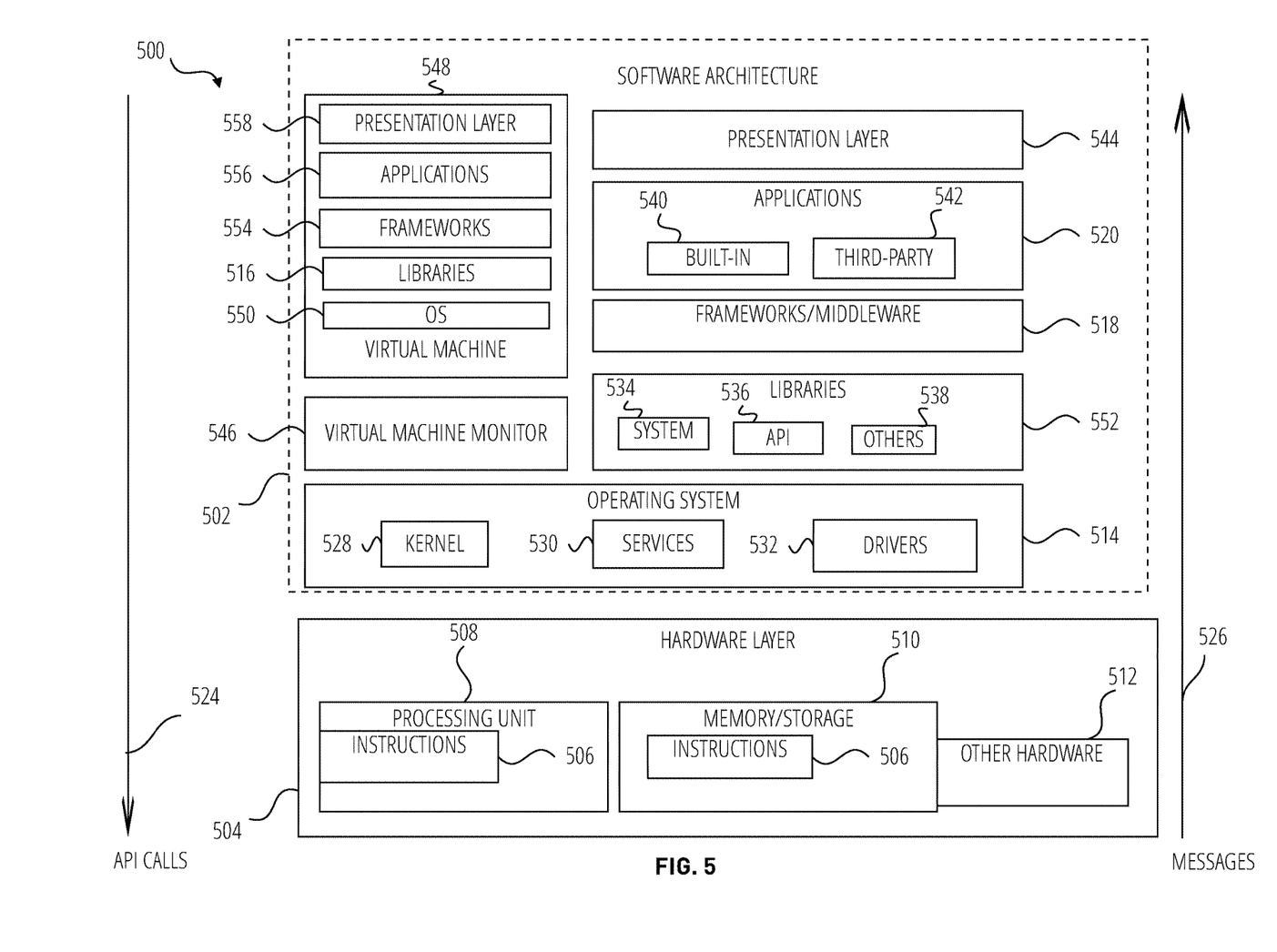
FIG. 5 is a block diagram showing one example of a software architecture for a computing device, according to some example embodiments.

Each feature flag configuration (e.g., set of feature flags) in the routing feature flag data 130 is associated with a vehicle 102. For example, the routing engine receives, via an application programming interface (API), an instruction to associate the set of feature flags with the vehicle 102. FIG. 5 is a block diagram 500 showing one example of a software architecture 502 for a computing device. The software architecture 502 may be used in conjunction with various hardware architectures, for example, as described herein. FIG. 5 is merely a non-limiting example of a software architecture 502, and many other architectures may be implemented to facilitate the functionality described herein. A representative hardware layer 504 is illustrated and can represent, for example, any of the above-referenced computing devices. In some examples, the hardware layer 504 may be implemented according to an architecture 600 of FIG. 6 and/or the software architecture 502 of FIG. 5.

The representative hardware layer 504 comprises one or more processing units 506 having associated executable instructions 508. The executable instructions 508 represent the executable instructions of the software architecture 502, including implementation of the methods, modules, components, and so forth of FIGS. 1-4. The hardware layer 504 also includes memory and/or storage modules 510, which also have the executable instructions 508. The hardware layer 504 may also comprise other hardware 512, which represents any other hardware of the hardware layer 504, such as the other hardware illustrated as part of the architecture 1100.

In the example architecture of FIG. 5, the software architecture 502 may be conceptualized as a stack of layers where each layer provides particular functionality. For example, the software architecture 502 may include layers such as an operating system 514, libraries 516, frameworks/middleware 518, applications 520, and a presentation layer 544. Operationally, the applications 520 and/or other components within the layers may invoke application programming interface (API) calls 524 through the software stack and receive a response, returned values, and so forth illustrated as messages 526 in response to the API calls 524. The layers illustrated are representative in nature, and not all software architectures have all layers. For example, some mobile or special-purpose operating systems may not provide a frameworks/middleware 518 layer, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. In some examples, the services 530 include an interrupt service. The interrupt service may detect the receipt of a hardware or software interrupt and, in response, cause the software architecture 502 to pause its current processing and execute an interrupt service routine (ISR) when an interrupt is received. The ISR may generate an alert.

The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), WiFi® drivers, near-field communication (NFC) drivers, audio drivers, power management drivers, and so forth depending on the hardware configuration.

The libraries 516 may provide a common infrastructure that may be used by the applications 520 and/or other components and/or layers. The libraries 516 typically provide functionality that allows other software modules to perform tasks in an easier fashion than by interfacing directly with the underlying operating system 514 functionality (e.g., kernel 528, services 530, and/or drivers 532). The libraries 516 may include system libraries 534 (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks 518 (also sometimes referred to as middleware) may provide a higher-level common infrastructure that may be used by the applications 520 and/or other software components/modules. For example, the frameworks 518 may provide various graphical user interface (GUI) functions, high-level resource management, high-level location services, and so forth. The frameworks 518 may provide a broad spectrum of other APIs that may be used by the applications 520 and/or other software components/modules, some of which may be specific to a particular operating system or platform.

The applications 520 include built-in applications 540 and/or third-party applications 542. Examples of representative built-in applications 540 may include, but are not limited to, a contacts application, a browser application, a book reader application, a location application, a media application, a messaging application, and/or a game application. The third-party applications 542 may include any of the built-in applications 540 as well as a broad assortment of other applications. In a specific example, the third-party application 542 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 542 may invoke the API calls 524 provided by the mobile operating system such as the operating system 514 to facilitate functionality described herein.

The applications 520 may use built-in operating system functions (e.g., kernel 528, services 530, and/or drivers 532), libraries (e.g., system libraries 534, API libraries 536, and other libraries 538), or frameworks/middleware 518 to create user interfaces to interact with users of the system. Alternatively, or additionally, in some systems, interactions with a user may occur through a presentation layer, such as the presentation layer 544. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 5, this is illustrated by a virtual machine 548. A virtual machine creates a software environment where applications/modules can execute as if they were executing on a hardware computing device. The virtual machine 548 is hosted by a host operating system (e.g., the operating system 514) and typically, although not always, has a virtual machine monitor 546, which manages the operation of the virtual machine 548 as well as the interface with the host operating system (e.g., the operating system 514). A software architecture executes within the virtual machine 548, such as an operating system 550, libraries 552, frameworks/middleware 554, applications 556, and/or a presentation layer 558. These layers of software architecture executing within the virtual machine 548 can be the same as corresponding layers previously described or may be different.

Figure 6:
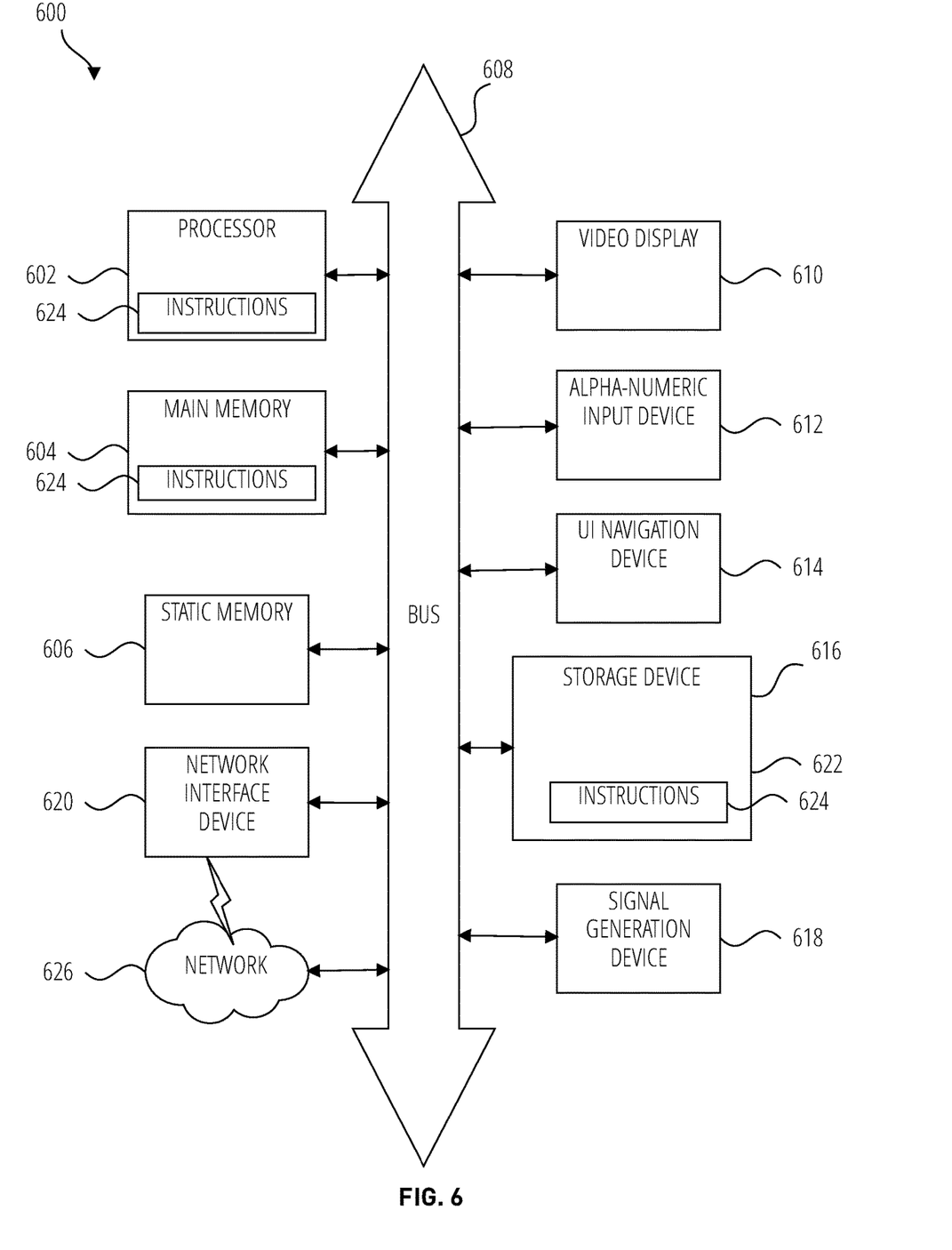
FIG. 6 is a block diagram illustrating a computing device hardware architecture, within which a set or sequence of instructions can be executed to cause a machine to perform examples of any one of the methodologies discussed herein, according to some example embodiments.

FIG. 6 is a block diagram illustrating a computing device hardware architecture 600, within which a set or sequence of instructions can be executed to cause a machine to perform examples of any one of the methodologies discussed herein. The hardware architecture 600 describes a computing device for executing the vehicle autonomy system, described herein.

The architecture 600 may operate as a standalone device or may be connected (e.g., networked) to other machines. In a networked deployment, the architecture 600 may operate in the capacity of either a server or a client machine in server-client network environments, or it may act as a peer machine in peer-to-peer (or distributed) network environments. The architecture 600 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 600 includes a processor unit 602 comprising at least one processor (e.g., a central processing unit (CPU), a graphics processing unit (GPU), or both, processor cores, compute nodes). The architecture 600 may further comprise a main memory 604 and a static memory 606, which communicate with each other via a link 608 (e.g., a bus). The architecture 600 can further include a video display unit 610, an input device 612 (e.g., a keyboard), and a UI navigation device 614 (e.g., a mouse). In some examples, the video display unit 610, input device 612, and UI navigation device 614 are incorporated into a touch-screen display. The architecture 600 may additionally include a storage device 616 (e.g., a drive unit), a signal generation device 618 (e.g., a speaker), a network interface device 620, and one or more sensors (not shown), such as a Global Positioning System (GPS) sensor, compass, accelerometer, or other sensor.

In some examples, the processor unit 602 or another suitable hardware component may support a hardware interrupt. In response to a hardware interrupt, the processor unit 602 may pause its processing and execute an ISR, for example, as described herein.

The storage device 616 includes a machine-readable medium 622 on which is stored one or more sets of data structures and instructions 624 (e.g., software) embodying or used by any one or more of the methodologies or functions described herein. The instructions 624 can also reside, completely or at least partially, within the main memory 604, within the static memory 606, and/or within the processor unit 602 during execution thereof by the architecture 600, with the main memory 604, the static memory 606, and the processor unit 602 also constituting machine-readable media.

Executable Instructions and Machine-Storage Medium

The various memories (i.e., 604, 606, and/or memory of the processor unit(s) 602) and/or the storage device 616 may store one or more sets of instructions and data structures (e.g., the instructions 624) embodying or used by any one or more of the methodologies or functions described herein. These instructions, when executed by the processor unit(s) 602, cause various operations to implement the disclosed examples.

As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 can further be transmitted or received over a communications network 626 using a transmission medium via the network interface device 620 using any one of a number of well-known transfer protocols (e.g., Hypertext Transfer Protocol (HTTP)). Examples of communication networks include a local area network (LAN), a wide area network (WAN), the Internet, mobile telephone networks, plain old telephone service (POTS) networks, and wireless data networks (e.g., Wi-Fi, 3G, 4G Long-Term Evolution (LTE)/LTE-A, 5G, or WiMAX networks).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

What is claimed is:

1. A method for generating a route for an autonomous vehicle traversing a roadway, the method comprising:
   accessing, using one or more processors, a set of feature flags, a first feature flag in the set of feature flags describing autonomous vehicle navigation behavior on a routing graph describing the roadway, and wherein the set of feature flags comprises a vehicle operator feature flag representing whether the autonomous vehicle is operated autonomously, the vehicle operator feature flag having a Boolean flag value;
   associating the set of feature flags with the autonomous vehicle;
   applying the associated set of feature flags to a graph traversal algorithm to generate a modified graph traversal algorithm;
   generating the route using the modified graph traversal algorithm, the route comprising a single route for the autonomous vehicle based on autonomous vehicle constraints and roadway constraints; and
   causing the autonomous vehicle to execute the route.

2. The method of claim 1, wherein each feature flag in the set of feature flags has a flag value.

3. The method of claim 1, wherein the vehicle operator feature flag has a true Boolean value, the method further comprising:
   classifying a roadway element that can be traversed by the autonomous vehicle as a permitted maneuver.

4. The method of claim 1, wherein the vehicle operator feature flag has a false Boolean value, the method further comprising:
   classifying a roadway element that cannot be traversed by the autonomous vehicle as a forbidden maneuver; and
   generating the route using the modified graph traversal algorithm, the generated route excluding the roadway element.

5. The method of claim 1, wherein the set of feature flags comprises a weighted feature flag representing an importance of an aspect of vehicle navigation behavior, the weighted feature flag having an integer value.

6. The method of claim 1, wherein associating the set of feature flags with the autonomous vehicle further comprises:
   receiving, via an application programming interface, an instruction to associate the set of feature flags with the autonomous vehicle.

7. The method of claim 1, wherein the roadway comprises roadway elements on a geographical map.

8. A system comprising:
   a processor; and
   a memory storing instructions that, when executed by the processor, configure the system to perform operations comprising:
   accessing a set of feature flags, a first feature flag in the set of feature flags describing autonomous vehicle navigation behavior on a routing graph describing a roadway, and wherein the set of feature flags comprises a vehicle operator feature flag representing whether the autonomous vehicle is operated autonomously, the vehicle operator feature flag having a Boolean flag value;

associating the set of feature flags with an autonomous vehicle;

applying the associated set of feature flags to a graph traversal algorithm to generate a modified graph traversal algorithm;

generating a route using the modified graph traversal algorithm, the route comprising a single route for the autonomous vehicle based on autonomous vehicle constraints and roadway constraints; and causing the autonomous vehicle to execute the route.

9. The system of claim 8, wherein each feature flag in the set of feature flags has a flag value.

10. The system of claim 8, wherein the vehicle operator feature flag has a true Boolean value, the operations further comprising:

classifying a roadway element that can be traversed by the autonomous vehicle as a permitted maneuver.

11. The system of claim 8, wherein the vehicle operator feature flag has a false Boolean value, the operations further comprising:

classifying a roadway element that cannot be traversed by the autonomous vehicle as a forbidden maneuver; and generating the route using the modifying graph traversal algorithm, the generated route excluding the roadway element.

12. A non-transitory computer-readable storage medium, the computer-readable storage medium including instructions that when executed by a computer, cause the computer to perform operations comprising:

accessing a set of feature flags, a first feature flag in the set of feature flags describing autonomous vehicle navigation behavior on a routing graph describing a roadway, and wherein the set of feature flags comprises a vehicle operator feature flag representing whether the autonomous vehicle is operated autonomously, the vehicle operator feature flag having a Boolean flag value;

associating the set of feature flags with an autonomous vehicle;

applying the associated set of feature flags to a graph traversal algorithm to generate a modified graph traversal algorithm;

generating a route using the modified graph traversal algorithm, the route comprising a single route for the autonomous vehicle based on autonomous vehicle constraints and roadway constraints; and causing the autonomous vehicle to execute the route.

13. A method for generating a route for an autonomous vehicle traversing a roadway, the method comprising:

accessing, using one or more processors, a set of feature flags, a first feature flag in the set of feature flags describing autonomous vehicle navigation behavior on a routing graph describing the roadway, and wherein the set of feature flags comprises a lane change feature flag representing whether the autonomous vehicle is capable of changing lanes on the roadway, the lane change feature flag having a Boolean flag value;

associating the set of feature flags with the autonomous vehicle;

applying the associated set of feature flags to a graph traversal algorithm to generate a modified graph traversal algorithm;

generating the route using the modified graph traversal algorithm, the route comprising a single route for the autonomous vehicle based on autonomous vehicle constraints and roadway constraints; and causing the autonomous vehicle to execute the route.

14. The method of claim 13, wherein the lane change feature flag as a true Boolean value, the method further comprising:

classifying a roadway element that can be traversed by the autonomous vehicle as a permitted maneuver.

15. The method of claim 13, wherein the lane change feature flag as a false Boolean value, the method further comprising:

classifying a roadway element that cannot be traversed by the autonomous vehicle as a forbidden maneuver; and generating the route using the modified graph traversal algorithm, the generated route excluding the roadway element.

16. A system comprising:

a processor; and a memory storing instructions that, when executed by the processor, configure the system to perform operations comprising:

accessing a set of feature flags, a first feature flag in the set of feature flags describing autonomous vehicle navigation behavior on a routing graph describing a roadway, and wherein the set of feature flags comprises a lane change feature flag representing whether the autonomous vehicle is capable of changing lanes on the roadway, the lane change feature flag having a Boolean flag value;

associating the set of feature flags with an autonomous vehicle;

applying the associated set of feature flags to a graph traversal algorithm to generate a modified graph traversal algorithm;

generating a route using the modified graph traversal algorithm, the route comprising a single route for the autonomous vehicle based on autonomous vehicle constraints and roadway constraints; and causing the autonomous vehicle to execute the route.

17. The system of claim 16, wherein the lane change feature flag as a true Boolean value, the operations further comprising:

classifying a portion of the roadway that can be traversed by the autonomous vehicle as a permitted maneuver.

18. The system of claim 16, wherein the lane change feature flag as a false Boolean value, the operations further comprising:

classifying a portion of the roadway that cannot be traversed by the autonomous vehicle as a forbidden maneuver; and generating the route using the modified graph traversal algorithm, the generated route excluding the portion of the roadway.

* * * * *